(No Model.)
M. J. WIGHTMAN.
ELECTRIC BOND.
No. 569,266. Patented Oct. 13, 1896.
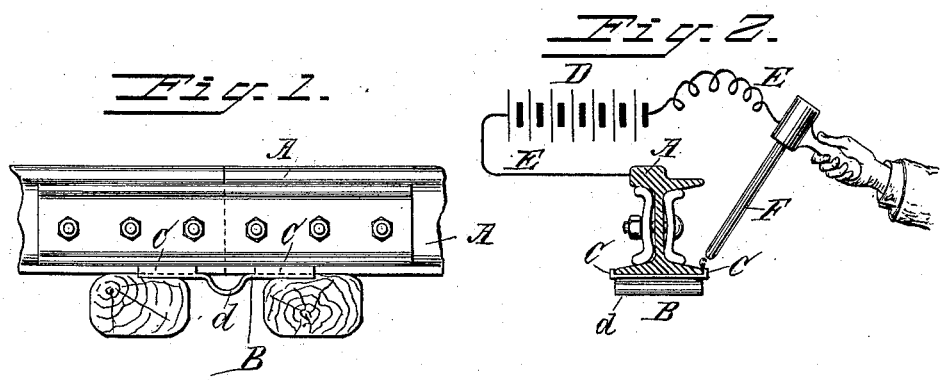
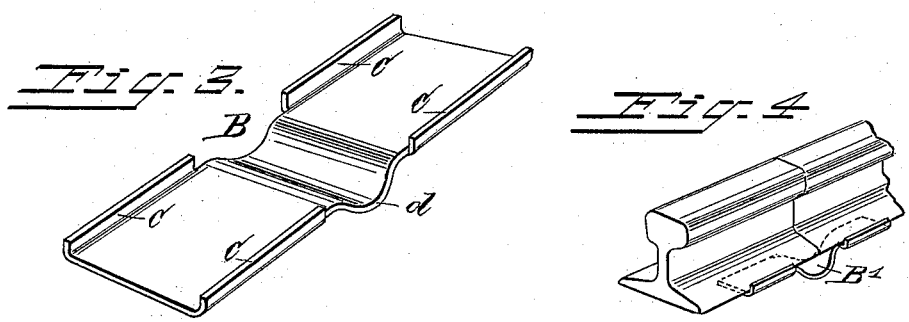
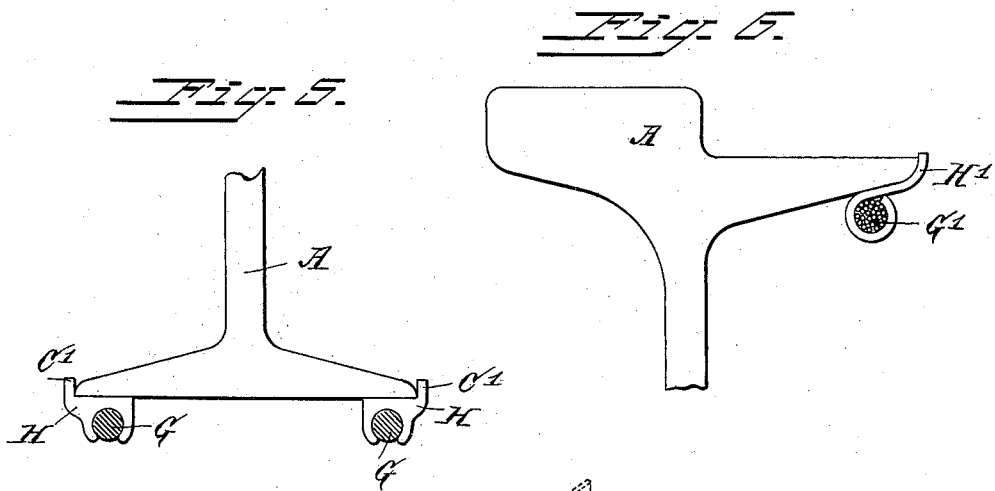
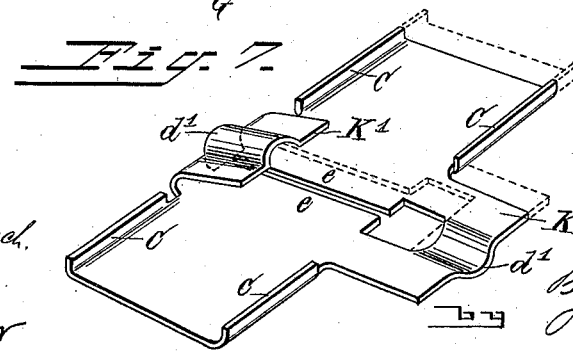
WITNESSES:
Henry T. Hirsch.
H. T. Capel
D. H. Decker
INVENTOR:
Merle J. Wightman.
By H. C. Townsend
ATTORNEY.

UNITED STATES PATENT OFFICE.

MERLE J. WIGHTMAN, OF SCRANTON, PENNSYLVANIA.

ELECTRIC BOND.

SPECIFICATION forming part of Letters Patent No. 569,266, dated October 13, 1896.

Application filed February 20, 1896. Serial No. 580,006. (No model.)

*To all whom it may concern:*

Be it known that I, MERLE J. WIGHTMAN, a citizen of the United States, and a resident of Scranton, in the county of Lackawanna and State of Pennsylvania, have invented a certain new and useful Electric Bond, of which the following is a specification.

My invention relates to electrical connections between the members of an iron structure through which an electric current is to be conveyed, and especially to the formation and application of said connections, commonly termed "bonds," to flanged iron-work, such as girders and rails.

Since the application of electric signaling to railroads and electric motors to street-cars made it necessary to electrically join or connect the rails of the tracks there have been many unsuccessful attempts made to obtain an effective and practical bond; but on account of one defect or another the bonds devised have not proved satisfactory.

The requirements for a perfect bond are, first, that it shall be of as great conductive capacity as the maximum conductive capacity required for the rails which its joins; second, that it shall be of such material as to make with the rails a perfect and lasting electrical contact; third, that the area of contact with the rails shall be sufficient to allow an unrestricted flow of current through it, and, fourth, that the bond shall be so formed as to allow for expansion and contraction of the rails.

Most of the bonds heretofore used have been defective in one or more of the above essential features. To produce a bond of sufficient conductive capacity, copper wires or cables have been used; but a copper bond rapidly deteriorates at the union with the rails because of some chemical or electrolytic action taking place between the unlike metals. Also where copper or iron bonds have been used they have been generally riveted to the rails; but no matter how firmly the riveting is done the meeting surfaces corrode and impair the electrical contact. Furthermore, the area of contact between the riveted bonds and the rails is insufficient to provide an unimpeded flow of current. All these objections I overcome by taking a bond with an expansion loop or bend to span the joint and welding or brazing the portions at the end of such bend edge to edge to the girders or rails by the electric arc. This enables me to make perfect electrical connection and to extend the contact-surface over any desired area.

With these objects in view my invention consists in a rail-bond constructed and applied substantially in the manner hereinafter specified and claimed.

In the accompanying drawings, forming a part of this specification, Figure 1 represents in side elevation portions of meeting rails with my improved bond applied thereto. Fig. 2 represents a section through the rail, showing the bond in end elevation and diagrammatically illustrating a mode of welding or brazing the bond to the rail. Fig. 3 represents in perspective the preferred form of bond. Fig. 4 represents in perspective a modified form of bond as applied. Figs. 5 and 6 represent modified forms of my bond, the latter also showing a bond attached to a different portion of the rail from that shown in the previous figures. Fig. 7 represents in perspective a modification in the plate-bond.

Though I propose to use my improved bond in connection with rails or girders used for any purpose whatever and forming paths for electric currents, I have chosen to show it in its most common use—viz., in connection with railway-rails.

A indicates a railway-rail, of which two are shown as joined together by fish-plates and mounted upon ties in the usual manner in Fig. 1. The bond shown in this figure and in Fig. 2, at B, preferably consists of a plate of iron having lateral upturned lips C at each end and curved or bent at d to allow for the usual expansion and contraction of the rails. The bond is generally placed under the rail, as represented, with said lips resting against the edge of the base-flanges of the rail. It is then welded or brazed to the rail by a weld made between the lips of the bond and the edges or flanges of the rail, since these thin portions of the rail are more readily brought to a welding heat.

The most efficient means for producing the weld is the electric arc, which may be produced and applied in any of the well-known ways, one of which is typically illustrated in Fig. 2 by the source of current D, conductors E, and a carbon point F. The form of bond also especially adapts it to this mode of welding since the underlying portion holds to the rail any metal flowing or tending to flow from the weld.

The form of bond shown in Figs. 1 and 2 I believe to be the most practical and is preferably made of the same material as the rails. The bond may, however, be reduced in size and applied simply to one edge of the base of the rail, as indicated at B' in Fig. 4. I may also find it advantageous to use a bond consisting of a copper or other wire having clips of cast brass or iron secured to the ends thereof and provided with lips C', by which they may be welded or brazed to the rail, as above described. Such a bond is illustrated in Fig. 5, wherein the wire is represented at G and the clips at H. I may also find it expedient to secure the bond to one of the upper flanges of the rail, as indicated in Fig. 6, and to make such bond from a wire or cable G', having a clip, as H', secured at each end thereof, and consisting of a strip of metal wrapped about the end of the cable and curved to conform to the surface of the flange to which it is to be welded or brazed.

It will be noted that the bonds above described are placed under the rails or flanges thereof out of the way and yet have the portions thereof by which they are attached conveniently located for welding or brazing. In this location, however, it is necessary to use the ties or sleepers at each joint, as indicated in Fig. 1. Said ties, however, may, as shown, be placed very close together and prevent any springing at the joint.

To provide for using but one tie or sleeper at a joint, the bond may be constructed as shown in Fig. 7, wherein the connecting curved portions d' are adapted to rest above the base of the rail, while the main portion of the bond may serve as a chair or readily accommodate itself to a chair. This form of bond, like those of Figs. 1 and 4, may be struck from a plate of metal, the parts K K' projecting laterally and the ends e e being at the distance apart indicated by the broken lines. Then the bends d' may be formed in portion K, which act will bring the said ends very nearly together.

When the bond is applied, or even before application, the portions K K' may be bent into an upright position or folded over the baseflanges of the rail into the position shown for K'.

The contact area between the bond and the rail is mainly that of the weld, though the flat portion of the bond or of the clips H H' may engage the rails sufficiently to increase said area, or even be welded thereto to some extent by the metal flowing from the weld.

It is obvious that with bonds thus constructed the portion to be welded may be extended to any degree necessary to produce the desired contact area; also, that the breadth and thickness of the bond B may be increased or decreased to correspond to the maximum conductive capacity required for the rails.

What I claim as my invention is—

1. The combination with meeting sections of flanged metal traversed by the electric current, of an electric bond consisting of a metal plate lying against said sections with a thin edge contiguous to the edge of the flanges of the respective sections and constructed to allow for expansion and contraction at the joint, the thin edge of the flange and plate being fused together, as and for the purpose described.

2. The combination with meeting rails, of a bond provided with one or more lateral lips and welded or brazed at said lips to the edge of the flanges of the respective rails, the intermediate portion of the bond being bent or curved over the joint between the rails.

3. An electric bond for flanged metal-work consisting of a continuous plate of metal having upturned lips C, for union with the edge of a metal flange, and a bent or curved intermediate portion d, as and for the purpose described.

Signed at New York, in the county of New York and State of New York, this 4th day of January, A. D. 1896.

MERLE J. WIGHTMAN.

Witnesses:
WM. H. CAPEL,
DELBERT H. DECKER.